US011161374B2

(12) United States Patent
Ascanelli et al.

(10) Patent No.: US 11,161,374 B2
(45) Date of Patent: *Nov. 2, 2021

(54) CAR TYRE

(71) Applicant: PIRELLI TYRE S.P.A., Milan (IT)

(72) Inventors: Alessandro Ascanelli, Milan (IT); Roberto Bolzoni, Milan (IT); Anna Paola Fioravanti, Milan (IT); Stefano Montesello, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 0 days.

This patent is subject to a terminal disclaimer.

(21) Appl. No.: 16/662,459

(22) Filed: Oct. 24, 2019

(65) Prior Publication Data

US 2020/0055350 A1 Feb. 20, 2020

Related U.S. Application Data

(63) Continuation of application No. 15/318,188, filed as application No. PCT/IB2015/054537 on Jun. 16, 2015, now Pat. No. 10,486,474.

(30) Foreign Application Priority Data

Jun. 19, 2014 (IT) .......................... RM2014A000325

(51) Int. Cl.
*B60C 11/03* (2006.01)
*B60C 11/12* (2006.01)

(52) U.S. Cl.
CPC ...... *B60C 11/1236* (2013.01); *B60C 11/0302* (2013.01); *B60C 11/033* (2013.01);
(Continued)

(58) Field of Classification Search
CPC ............ B60C 11/0302; B60C 11/0306; B60C 11/033; B60C 2011/0353;
(Continued)

(56) References Cited

U.S. PATENT DOCUMENTS 4,700,762 A 10/1987 Landers
5,238,038 A 8/1993 Glover
(Continued)

FOREIGN PATENT DOCUMENTS

EP 0 565 270 10/1993
EP 0 718 125 6/1996
(Continued)

OTHER PUBLICATIONS

International Search Report from the European Patent Office for International Application No. PCT/IB2015/054537, dated Nov. 2, 2015.
(Continued)

*Primary Examiner* — Eric Hug
(74) *Attorney, Agent, or Firm* — Finnegan, Henderson, Farabow, Garrett & Dunner, L.L.P.

(57) ABSTRACT

A car tyre having a tread that extends in axial direction for a width the tread including a central portion arranged across an equatorial plane, and two lateral portions opposed with respect to the central portion. The central portion is separated from the lateral portions of the tread by two circumferential grooves. The circumferential grooves have a width greater than about 6 mm. The central portion extends in axial direction for a width less than 20% of the width of the tread and includes a plurality of first sipes. Each lateral portion has a width greater than 30% of the width of the tread, and each lateral portion includes, furthermore, a plurality of transversal grooves. The transversal grooves of a lateral portion include at least a first inclined length that extends from a zone proximal to the respective circumferential grooves, moving away from the equatorial plane. The first inclined length has an inclination α≤60° with respect to equatorial plane. Each lateral portion includes a plurality of sipes. The
(Continued)

density of the sipes decreases moving away from the equatorial plane.

31 Claims, 3 Drawing Sheets

(52) U.S. Cl.
CPC ..... B60C 11/0306 (2013.01); *B60C 2011/036* (2013.01); *B60C 2011/0341* (2013.01); *B60C 2011/0348* (2013.01); *B60C 2011/0355* (2013.01); *B60C 2011/0367* (2013.01); *B60C 2011/0372* (2013.01); *B60C 2011/0374* (2013.01); *B60C 2011/0388* (2013.01); *B60C 2011/1295* (2013.01)

(58) Field of Classification Search
CPC ..... B60C 2011/0355; B60C 2011/0365; B60C 2011/0367; B60C 2011/0376; B60C 2011/0379; B60C 11/12; B60C 11/1236; B60C 2011/129; B60C 2011/1295
USPC ................................... 152/209.18
See application file for complete search history.

(56) References Cited

U.S. PATENT DOCUMENTS

| | | | |
|---|---|---|---|
| 6,571,844 B1 | 6/2003 | Ochi | |
| 6,892,775 B1 | 5/2005 | Himuro | |
| 7,814,951 B2 | 10/2010 | Ochi | |
| 10,486,474 B2 * | 11/2019 | Ascanelli | B60C 11/033 |
| 2004/0256039 A1 | 12/2004 | Ratliff | |
| 2007/0089821 A1 | 4/2007 | Kishizoe | |
| 2007/0089822 A1 | 4/2007 | Ochi | |
| 2010/0132864 A1 | 6/2010 | Colombo | |
| 2013/0118662 A1 | 5/2013 | Kameda | |
| 2013/0240100 A1 | 9/2013 | Miyoshi et al. | |
| 2014/0150940 A1 | 6/2014 | Guichon et al. | |
| 2014/0290815 A1 | 10/2014 | Tomida | |
| 2016/0039249 A1 | 2/2016 | Takahashi | |
| 2016/0114629 A1 | 4/2016 | Hashimoto | |

FOREIGN PATENT DOCUMENTS

| | | | | |
|---|---|---|---|---|
| EP | 0718125 | * | 6/1996 | ........... B60C 11/033 |
| EP | 1 437 237 | | 7/2004 | |
| EP | 2 156 968 | | 2/2010 | |
| JP | 7-179014 | | 7/1995 | |
| JP | 2002264612 A | | 9/2002 | |

OTHER PUBLICATIONS

Written Opinion of the International Searching Authority from the European Patent Office for International Application No. PCT/IB2015/054537, dated Nov. 2, 2015.
Notification of First Office Action, dated Apr. 6, 2021, issued in counterpart Chinese Patent Application 201911033907.7 (16 pages).

* cited by examiner

CAR TYRE

CROSS REFERENCE TO RELATED APPLICATIONS

This application is a continuation of U.S. patent application Ser. No. 15/318,188 (now allowed), filed Dec. 12, 2016, which is a national phase application based on PCT/IB2015/054537, filed Jun. 16, 2015, and claims the priority of Italian Patent Application No. RM2014A000325, filed Jun. 19, 2014, the content of each application being incorporated herein by reference.

FIELD OF THE INVENTION

The present invention relates to a car tyre, in particular, an "all season" tyre for medium displacement cars, for example 1200-1600 cm3.

BACKGROUND ART

The following documents describe some car tyres: U.S. Pat. No. 4,700,762; EP 0 565 270; EP 2 156 968 and EP 1 437 237.

SUMMARY OF THE INVENTION

The so called "all season" tyres are suitable to be used both in winter and in summer and for this peculiarity, that does not obligate the user to have two set of dedicated tyres, each one suitable for a specific season, they are highly appreciated and required by the users.

For adapting to this exigency, to this type of tyre it is typically required a great flexibility of behavior, that should allow for providing performances which are comparable with those of the summer tyres in summer and of the winter ones in winter.

The Applicant has noticed that for having features being comparable with the so-called winter tyres, the "all season" tyres are typically characterized by a high number of grooves or carvings and by a deeper tread of the same, with respect to a common summer tyre.

The Applicant has observed that a number of transversal grooves with accentuated width improves traction especially on wet surfaces, and provides for a good flexibility of the portions of the tread band contained between them; an excessive use of the same can anyway compromise the performances on dry roads and increases the lyre noise.

The Applicant has further observed that the "all season" tyres can be characterized by the presence of a high siping, that is generally thin carvings that, in particular during the tyre rolling on snowy roads, incorporate a small amount thereof and, thanks to the greater friction produced by the snow-against-snow contact, confer the tyre a higher grip on this type of surface.

The Applicant has further noticed that for obtaining good handling on wet surfaces, low rolling resistance and noise, that is to say the performance features which are generally required to a summer tyre, the tread band should be characterized by a low number of carvings or grooves and by a not accentuated sizing of the same, in terms of depth and width.

In other words, the features that generally should provide a tyre a good winter behavior contrast with the realization of tyre with a good summer behavior. The design of an "all season" tyre appears therefore particularly complex.

The Applicant has felt the exigency of arrange a tread design for an "all season" tyre that has a good balancing between the performance features offered by a summer tyre and those offered by a winter tyre and that, at the same time, has a good regularity and wear resistance.

The Applicant has found that a tyre whose central zone of the tread band provides with performance features generally offered by a winter tyre and wherein the shoulder portions of the tread band provide for handling features generally offered by a summer tyre allows solving the reciprocally contrasting aforementioned problems.

In an aspect, the present invention relates to a car tyre, having a tread that extends in axial direction for a width L; said tread comprising a central portion arranged across an equatorial plane, and two lateral portions opposed with respect to the central portion.

The present invention, can have at least one of the preferred featured that are hereinafter described.

Preferably, the central portion is separated from the lateral portions of the tread by circumferential grooves.

Preferably, said circumferential grooves has a width greater than 6 mm.

Preferably, the central portion extends in axial direction for a width smaller than 20% of the width L of said tread.

Preferably, the central portion comprises a plurality of first sipes.

Preferably, each lateral portion has a width greater than 30% of the width L of said tread.

Preferably, each lateral portion comprises a plurality of transversal grooves.

Preferably, the transversal grooves of a lateral portion comprise, at least a first inclined length that extends from a zone proximal to the respective circumferential grooves moving away from the equatorial plane. Preferably, said first inclined length has an inclination $\alpha \leq 60°$ with respect to the equatorial plane.

Preferably, each lateral portion comprises a plurality of sipes.

Preferably, the density of the sipes decreases moving away from equatorial plane.

The density of the sipes greater in the central zone of the tread band, in conjunction with the size of the circumferential grooves allows for obtaining good performances of travelling on wet or snowy road surfaces.

At the same time the reduction of the density of the sipes moving away from equatorial plane, together with the size and orientation of the transversal grooves, confer the tread band a structural resistance in the shoulder zone, so as to provide the tyre with good performances of handling and quick traction response.

Furthermore, the relatively high quantity of tyre on the ground allows for obtaining good braking performances on dry road surface, as well as a low noise and low rolling resistance.

The extension and the inclination of the first portion of the transversal grooves, further than providing good braking/traction performances of the tyre while travelling in corner, helps for reducing the noise of the tread band.

In the context of the present invention, the following definitions are adopted:

For "equatorial plane" of the tyre it is meant a plane perpendicular to the rotation axis of the tyre and dividing the tyre in two symmetrically equal portions.

For "circumferential" direction it is meant a direction generally directed according to the rotation direction of the tyre, on in any case only slighlty inclined with respect to the rotation direction of the tyre.

For "axial" direction or "axially" it is meant a direction parallel or in any case only slightly inclined with respect to the rotation axis of the tyre.

For "inclination" of an element of the tread it is meant the module of the angle (from 0° to 90°) formed by the element with respect to a direction parallel to the equatorial plane of the tyre.

For "density" of the sipes it is meant the ratio between the overall extension of the sipes and the area of the portion wherein they are comprised. In the text of the present description the density values are intended as expressed in mm of extension per mm² of surface.

For "width" of a groove it is meant the width detected taking as reference the width of the radially outer edges of the groove.

For "void-to-rubber ratio" it is meant the ratio between the total surface of the grooves of a determined portion of the thread pattern of the tyre designed to lay on the ground (possibly of the whole tread pattern) and the total surface of the determined portion of tread pattern (possibly of the whole tread pattern).

For "axial extension" of an element of the tread it is meant the length of the projection of the same, measured along an axial direction.

Preferably, the density of the first sipes of the central portion is greater than the density of the sipes of each lateral portion and the density of the sipes of each lateral portion decreases moving away from equatorial plane.

Conveniently, each lateral portion can comprise at least a first axially inner lateral sub-portion and a second axially outer sub-portion.

Preferably the first lateral sub-portion and the second lateral sub-portion comprise respectively plurality of second and third sipes.

Preferably the density of the first sipes is greater than the density of the second sipes.

Preferably the density of the second sipes is greater than the density of the third sipes.

Conveniently, the central portion has a density of the first sipes comprised in the range between about 0.160 and about 0.180.

Advantageously, the first lateral sub-portion can have a density of second sipes comprised in the range between about 0.140 and about 0.160.

Preferably, the second lateral sub-portion can have a density of third sipes comprised in the range between about 0.080 and about 0.110.

Conveniently, the first sipes can extend substantially perpendicularly to the equatorial plane.

Preferably, the central portion can comprise at least a circumferential rib.

Conveniently, the tread comprises a void-to-rubber ratio greater than 0.270.

Advantageously, the first sipes are spaced in circumferential direction and are substantially without points of reciprocal intersection.

Preferably, the first sipes are reciprocally parallel.

Conveniently the first sipes can have a zigzag profile with respect to an axis orthogonal to the equatorial plane.

Conveniently, the central portion can have a void-to-rubber ratio greater than 0.35.

Advantageously, the lateral portions can have a void-to-rubber ratio greater than 0.26.

Conveniently, the transversal grooves can extend, moving axially away from the equatorial plane, from a first circumferential groove to the tread edge.

Preferably, each transversal groove can comprise furthermore at least a second inclined length and at least a linking length interposed between the first inclined length and the second inclined length.

The second inclined length can be counter inclined with respect to first inclined length.

Conveniently, the linking length can be arranged at a distance with respect to equatorial plane smaller than 40% of L/2.

Preferably, the linking length can be arranged at a distance with respect to equatorial plane comprised in the range between the 20% of L/2 and the 35% of L/2.

The applicant considers that the aforementioned positioning of the linking length represents the ideal trade-off for determining the portion of transversal groove that shall work for increasing the features of traction/braking while running in corners and the portion of transversal groove that shall work for increasing the features of traction/braking while running on straight stretch.

Advantageously, said at least a first inclined length can extend in the first lateral sub-portion from a first end in correspondence of one of the two circumferential grooves.

Preferably the second inclined length can extend in the second lateral sub-portion.

Conveniently, the first inclined length has an inclination $\alpha \geq 20°$ with respect to equatorial plane.

Advantageously, the first inclined length can have an axial extension smaller than 40% of the width of the lateral portion in which it extends.

Conveniently, the second inclined length has an axial extension greater than 50% of the width of the respective lateral portion in which it extends.

Preferably, the first inclined length and the second inclined length are, substantially, straight, while the linking length has a curvilinear profile.

Advantageously, the second inclined length can have an inclination $\beta \geq 45°$ with respect to the equatorial plane.

Preferably, the second inclined length can have an inclination $\beta$ comprised in the range between about 60° and about 85°.

For helping the water drainage during the rolling of the tyre, the transversal grooves can have a width that increases moving away from the equatorial plane.

Preferably, the transversal grooves can have a width greater than about 3 mm.

Advantageously the transversal grooves can have a depth greater than about 4 mm.

Said feature contributes in helping the water drainage during the rolling of the tyre.

Conveniently, the transversal grooves of a lateral portion can be circumferentially staggered with respect to the transversal grooves of the remaining lateral portion.

Said feature allows for reducing the noise of the tread.

Preferably the circumferential grooves can have a depth greater than about 7 mm.

Preferably the second sipes are reciprocally parallel.

Preferably, the second sipes are counter inclined with respect to first inclined length of the transversal grooves.

Advantageously, the second sipes can have an inclination $\gamma \leq 5.80°$ with respect to equatorial plane.

Preferably, the third sipes can extend substantially parallel each other and substantially parallel to the second inclined length.

Conveniently, the third sipes can extend axially for at least the 70% of the second lateral sub-portion.

Preferably, at least a part of the third sipes extends, on the second lateral sub-portion, on the prolongation of the second sipes so as to form substantially continuous sipes on the lateral portions.

Advantageously, the first lateral sub-portion can comprise fourth sipes between couples of second sipes adjacent in circumferential direction. Preferably the fourth sipes extend in a direction substantially orthogonal to the second sipes.

Preferably, the second lateral sub-portion can comprise fifth sipes between a third sipe and the adjacent one in circumferential direction or between a third sipe and the transversal groove adjacent in circumferential direction. Preferably the fifth sipes extend in a direction substantially orthogonal to the third sipes.

Conveniently, the first lateral sub-portion and the second lateral sub-portion are separated in axial direction by a first circumferential notch.

Preferably, the first circumferential notch can be placed at a distance with respect to equatorial plane smaller than 50% of the width of the respective lateral portion.

Advantageously, the first circumferential notch can intercept the transversal grooves, moving away from equatorial plane, in a point placed downstream of the first inclined length.

Preferably, the central portion L1 can comprise a second circumferential notch arranged across the equatorial plane.

Conveniently, the first circumferential notch and the second circumferential notch can have a width lower than the one of the circumferential grooves.

BRIEF DESCRIPTION OF THE FIGURES

Further features and advantages of the present invention shall be herewith illustrated with reference to embodiments shown for indicative purpose, non-limiting, in the accompanying figures, wherein.

DETAILED DESCRIPTION OF THE EMBODIMENTS OF THE INVENTION

Figure 1:
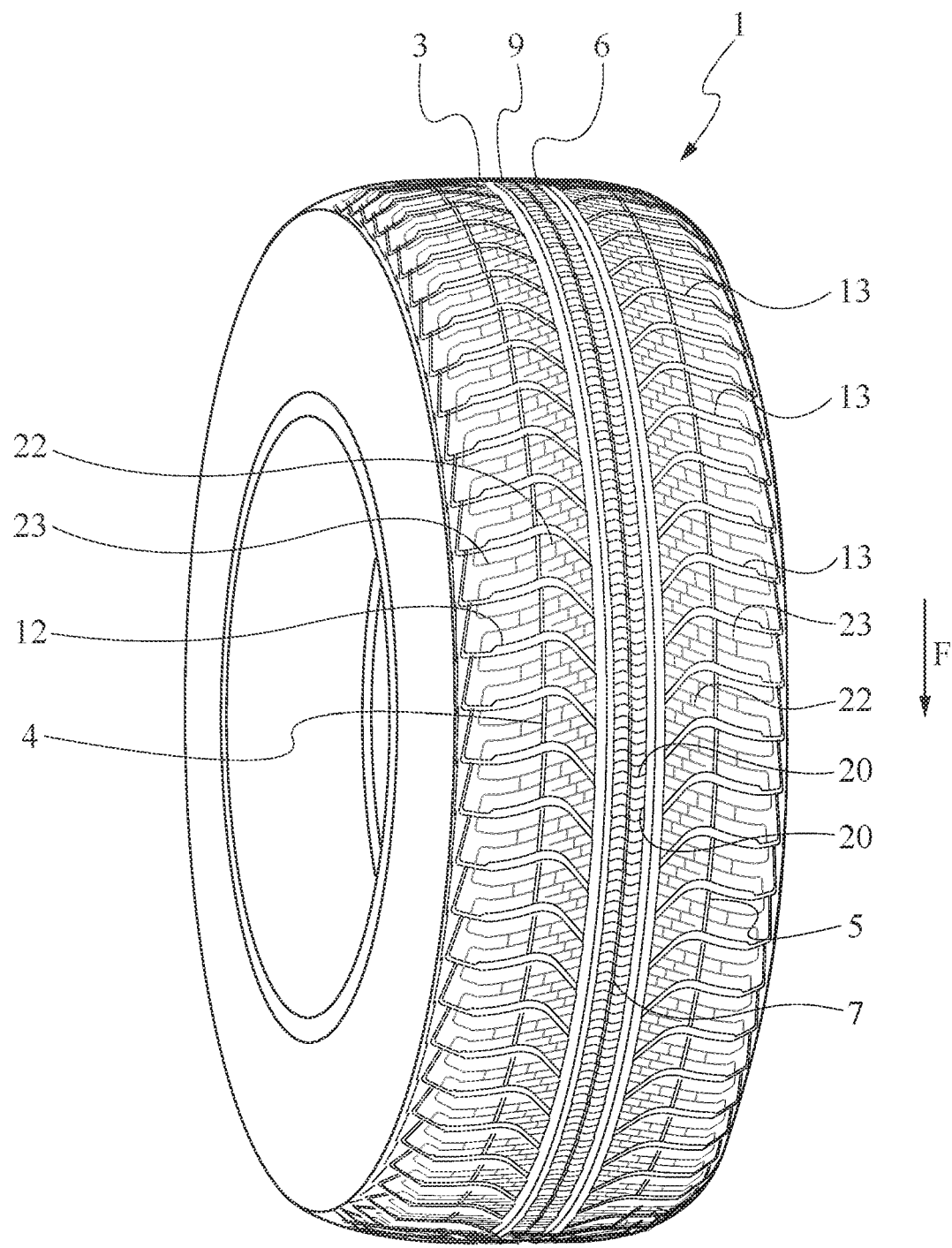
FIG. 1 is a perspective view of a tyre having a tread realized according to an example of the invention.
Figure 2:
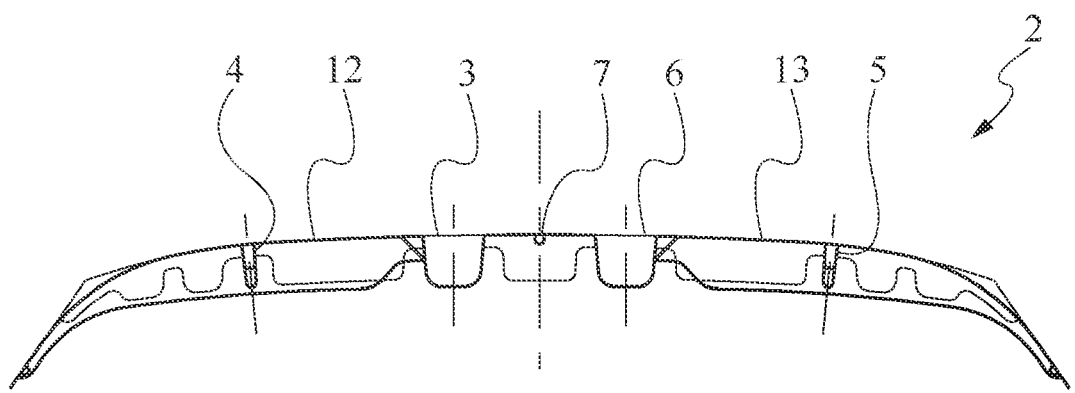
FIG. 2 is an enlarged section view of the tread of FIG. 1.
Figure 3:
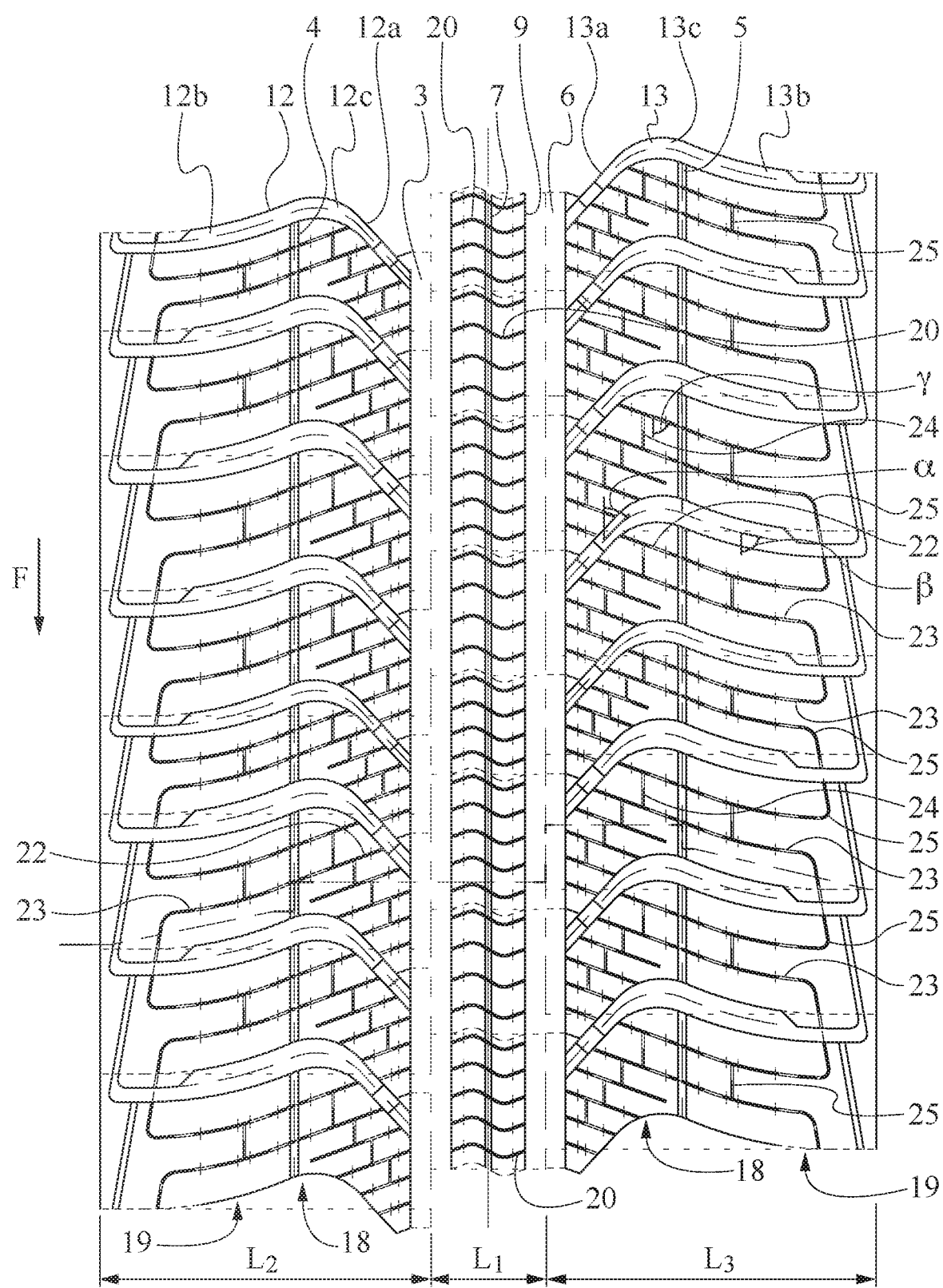
FIG. 3 is a top view of the tread of the tyre of FIG. 1.

In FIG. 1-3 is shown a tyre 1 having a tread 2 according to the present invention.

The tyre 1 has a conventional-type structure and comprises a carcass, a tread band arranged in the carcass crown, a couple of axially opposite sidewalls, ending in beads reinforced with bead cores and respective bead fillers. The tyre also comprises preferably a belt structure interposed between the carcass and tread band. The carcass is reinforced by one or more carcass plies anchored to the bead cores, whereas the belt structure comprises two radially and mutually overlapped belt strips.

The belt strips are formed by parts of rubberized fabric encasing metal cords, parallel to each other in each strip and crossing those of the adjacent strips, preferably symmetrically inclined with respect to the equatorial plane. Preferably, the belt structure also comprises a third belt layer, which is placed in a radially outermost position and provided with cords substantially parallel to the equatorial plane.

The tyre 1 preferably has a H/C ratio, between the height of the right section and maximum width of the section, of about 0.25 and about 0.80. The tyre 1 preferably has a nominal with comprised between about 145 mm and about 295 mm. The tyre 1 has a rim diameter comprised preferably between 13 and 18 inches.

For ensuring not only a long mileage but also high performances during the whole tyre life, in particular concerning the drainage and behavior on the snow, the tread 2 has an overall void-to-rubber ratio greater than about 0.27, preferably greater than about 0.30.

In the embodiment shown in FIGS. 1-3, the tread 2 has a central portion L1 arranged across an equatorial plane X-X, and two lateral portions L2, L3 opposite with respect to the central portion L1.

The central portion L1 is separed from the lateral portions L2, L3 of the tread by two circumferential grooves 3, 6.

The tread 2 shown in figures is particularly by sight formed by a central portion L1 of a limited size and two lateral portions L2, L3 with axially relevant size.

In detail, the central portion L1 extends in axial direction for a width smaller than 20% of the width L of the tread 2, whereas each lateral portion L2, L3 has an extension greater than 30% of the width L of the tread 2.

Preferably, the central portion L1 extends in axial direction for a width smaller than 15% of the width L of the tread 2.

The lateral portion L2 and the lateral portion L3 are axially limited, with respect to the central portion L1 of the tread 2, respectively by the circumferential grooves 3, 6.

As shown in FIG. 3, a limit marking between central portion L1 and lateral portions L2, L3 can be taken in correspondence of the median lines of the grooves 3, 6.

The circumferential grooves 3, 6 have a substantially straight profile in the circumferential direction, preferably for the whole circumferential development of the tyre.

The circumferential grooves 3, 6 have a straight section with considerable size since to those grooves is principally charged the duty of draining and removal of the water of the central portion L1 of the tyre.

For this purpose, the circumferential grooves 3, 6 preferably has a maximum depth comprised between about 4 mm and about 11 mm, more preferably, between about 5 mm and about 8 mm.

For the same reason, the circumferential grooves 3 and 6, have a width that can be comprised between about 6 mm and about 16 mm.

The circumferential grooves 3, 6, for providing optimal features of drainage, can furthermore have a substantially constant width for their whole depth.

In other words, they can have a groove bottom sufficiently large, comparable to the width of the groove measured in correspondence of the radially outer surfaces of the adjacent blocks and lateral walls with low inclination with respect to the median line of the groove.

Always referring to embodiment shown in figures, the circumferential grooves 3, 6 are shaped for having a straight section of substantial trapezoidal shape, preferably almost rectangular.

The tread 2 has a directional type pattern, in other words the pattern of the treaded portion is substantially speculate with respect to equatorial plane X-X and the substantially transversal grooves, that are arranged starting from the circumferential grooves 3, 6 in the direction of the sides of the tread band 2, define a rolling sense of the tyre 1, indicated by the arrow F in FIG. 2.

For "substantially speculate" in the definition just aforementioned it is meant a speculatory in wide sense, that can have slight differences in some details and/or the staggering of a part and/or portion of tyre on the right of the equatorial plane with respect to the left one.

In detail, each lateral portion L2, L3 comprises a plurality of transversal grooves 12, 13 that are circumferentially repeated.

The transversal grooves 12, 13 extend parallel respectively on the lateral portions L2, L3, without points of mutual intersection.

In other words any of two transversal grooves 12 adjacent of the portion L2 are always spaced in circumferential direction and therefore, as well, any two transversal grooves 13 adjacent of the portion L3.

In particular, the lengths of two circumferentially adjacent transversal grooves 12,13 have a mutual distance equal to at least about 20 mm, in proximity of the circumferential grooves 3, 6.

The transversal grooves 12, 13 axially extend for at least the 60% of the width of the respective lateral portion L2, L3.

Preferably, the transversal grooves 12, 13 axially extend for at least the 80% of the width of the respective lateral portion L2, L3.

In the embodiment shown in FIGS. 1-3, the transversal grooves 12, 13 extend from a first end, in correspondence of said two circumferential grooves 3, 6 and terminate in the respective edges of the tread 2.

Referring to embodiment shown in FIGS. 1-3, it can be seen as the transversal grooves 12, 13 of a lateral portion L2, L3 have, moving away from equatorial plane X-X, an almost substantially speculate profile, but preferably staggered, with respect to the transversal grooves 12, 13 arranged on the resting lateral portion L2, L3.

More in detail, for the purpose of balancing the behavior of the tyre in the various usage conditions, each transversal groove 12, 13 has a first inclined length 12a, 13a suitable for helping the water drainage in wet conditions and a second length 12b, 13b more external with respect to equatorial plane X-X and counter inclined with respect to the first length, for helping the traction/braking during the travelling particularly when running on straight stretches.

In detail, each transversal groove 12, 13 has at least a first inclined length 12a, 13a that extends from a first end in correspondence of one of the two circumferential grooves 3, 6, at least a second inclined length 12b, 13b and at least a linking length 12c, 13c interposed between the first inclined length 12a, 13a and the second inclined length 12b, 13b.

Referring to embodiment shown in figures, the first inclined length 12a, 13a has an extension smaller than the second inclined length 12b, 13b.

Preferably, the first length 12a, 13a has an axial extension smaller than 40% of the width of the lateral portion L2, L3 in which it extends, whereas the second inclined length 12b, 13b has an axial extension greater than 50% of the width of the respective lateral portion L2, L3 in which it extends.

Always referring to the embodiment shown in FIGS. 1-3, the first inclined length 12a, 13a has an inclination α≤60° with respect to equatorial plane X-X.

Preferably, the first inclined length 12a, 13a has an inclination α≥20° with respect to equatorial plane X-X.

More preferably, the first inclined length 12a, 13a has an inclination with respect to equatorial plane X-X, comprised in the range between 30° and 50°.

The low inclination of the portion 12a, 13a enhances the performances in bends, mostly on snow alternating the features of traction and lateral grip according to the angle of curve performed by the vehicle.

In fact, according to the type of bend, the angles arrange themselves alternatively in favor of traction and of the lateral forces due to the load transfer while cornering.

The applicant has furthermore discovered that a low inclination of the first inclined length 12a, 13a allows for reducing the noise generated by the transversal grooves 12, 13.

Referring to embodiment shown in figures, the second inclined length 12b, 13b has an inclination β≥45° with respect to equatorial plane X-X.

Preferably, the second inclined length 12b, 13b has an inclination β comprised in the range between about 60° and about 85°.

Always referring to embodiment shown in figure, it can be seen as the linking length 12c, 13c, between the first 12a, 13a and the second 12b, 13b inclined length is placed at a distance with respect to equatorial plane X-X smaller than 40% of L/2.

Preferably, the linking length 12c, 13c is placed at a distance with respect to equatorial plane X-X comprised in the range between the 20% of L/2 and the 35% of L/2.

The transversal grooves 12,13 have a width greater or equal than about 3 mm.

Preferably, the transversal grooves 12, 13 have a width smaller than about 10 mm.

For example they can have a width comprised between about 3 and about 8 mm.

For helping the water drainage from the circumferential grooves 3, 6 to the external ends of the tread while rolling, the transversal grooves 12, 13 have a width that increases moving away from the equatorial plane X-X.

Each transversal groove 12, 13 has a maximum depth of at least about 3 mm and smaller than about 10 mm. Preferably, each transversal groove 12, 13 has a maximum depth comprised between about 4 mm and about 8 mm.

Preferably, each transversal groove 12, 13 has a non-constant depth that decreases, preferably gradually, by moving from the axially external ends of the tyre.

In the embodiment shown in FIGS. 1-3 the central portion L1 comprises a unique circumferential rib 9 that axially extends from a first circumferential groove 3, 6 to the resting one.

As anticipated before, the central portion L1 of the tread 2 is shaped so as to provide a behavior of the tyre substantially comparable with the one of a so-called winter tyre, in other words it shall provide optimal performances of drainage and behavior on the snow.

To this end, the central portion L1 has a void-to-rubber ratio greater than about 0.35.

For obtaining such a void-to-rubber ratio, in the embodiment shown in FIGS. 1-3, the circumferential rib 9 has a plurality of first sipes 20 and a second circumferential notch 7.

Preferably, the second circumferential notch 7 extends across the equatorial plane X-X and has a substantially rectilinear profile.

In order to not to excessively weaken the circumferential rib 9, the second circumferential notch 7 preferably has a low depth and a not high width.

Preferably, the second circumferential notch 7 has a maximum depth that starts from about 1 mm to about 4 mm.

Always for the same reason, the second circumferential notch 7 has a maximum width that can be comprised between about 1 mm and about 3 mm.

Preferably, the first sipes 20 extend on the circumferential rib 9 from a first circumferential groove 3,6 to the resting one.

Always referring to embodiment shown in FIGS. 1-3, it can be noticed that the first sipes 20 are spaced circumferential direction and are substantially without points of reciprocal intersection.

In detail, preferably the first sipes 20 are reciprocally substantially parallel.

For trying to obtain the best grip conditions in both traction and braking, the first sipes 20 have an alternated directionality.

To this end, preferably the first sipes 20 have a zigzag profile with respect to an axis orthogonal to the equatorial plane X-X.

In the embodiment shown in figure, the first sipes 20 do not have a constant depth along their extension but in contrast, as better shown in FIG. 2, have a maximum depth in correspondence of their central portion and two respective section reductions in correspondence of the ends.

Alternatively, the first sipes 20 could have a constant depth along all their extensions without departing from the scope of protection of the present invention.

Preferably, the first sipes 20 have a maximum depth greater than 3 mm, more preferably greater than 6 mm. The first sipes 20 have a maximum depth smaller than 10 mm.

In the embodiment shown in figures the first sipes 20 have a maximum width smaller than 2 mm, preferably smaller than 1.5 mm.

Preferably, the lateral portions L2, L3 have a void-to-rubber ratio greater than 0.260.

For obtaining such a void-to-rubber ratio, in the embodiment shown in FIGS. 1-3, the lateral portions L2, L3 comprise, further than the transversal grooves 12, 13 previously described, a plurality of second and third sipes 22, 23 and two first circumferential notches 4, 5.

Each first circumferential notch 4, 5 has a not high width, preferably each first circumferential notch 4, 5 has a maximum width that can be comprised between about 1 mm and about 3 mm.

Preferably, each first circumferential notch 4, 5 has a maximum depth that starts from about 1 mm to about 3 mm.

In the embodiment shown in figure, each first circumferential notch 4, 5 does not have a constant depth along its own extension but in contrast, as better shown in FIG. 2, has un stepped depth profile, characterized by depth reductions in correspondence of the transversal grooves 12, 13 subdivided by full depth constant lengths.

Sais stepped profile of the depth of the first circumferential notches 4, 5 confers rigidity to the lateral portions L2, L3 in correspondence of the transversal grooves 12, 13 for reducing as much as possible the growth of irregular wear phenomena.

Preferably, for each lateral portion L2, L3 the first circumferential notch 4, 5 has a substantially rectilinear profile and extends circumferentially, parallel to the equatorial plane X-X.

Preferably, in each lateral portion L2, L3 the first circumferential notch 4, 5 is arranged at a distance, with respect to equatorial plane X-X, smaller than 50% of the width of the respective lateral portion L2, L3.

In the embodiment shown in figures, for each lateral portion L2, L3 the first circumferential notch 4, 5 intercepts the transversal grooves 12, 13 in a point which is placed on the development of the second inclined length 12b, 13b.

In each lateral portion L2, L3, the first circumferential notch 4, 5 detects a first axially inner lateral sub-portion 18 of tread 2 and a second axially outer lateral sub-portion 19 of tread 2.

The first lateral sub-portion 18 and the second lateral sub-portion 19 respectively comprise a plurality of second 22 and third sipes 23.

The Applicant considers that in a tyre like the one according to the present invention, characterized by a tread band provided with a low variety of grooves, with a limited number of circumferential grooves 3, 6 and a single type of transversal grooves 12, 13 that depart moving away from the equatorial plane X-X to the direction of the shoulders, the amount and the distribution of the sipes have a non-secondary importance in determining the performance features of the tyre.

As previously mentioned, while the central zone of the tread band is shaped for providing a behaviour of the tyre substantially comparable to the one of a so-called winter tyre, the shoulder zones of the tread band are shaped for conferring a behavior of the tyre comparable to the one of a so-called summer tyre, in other words they shall provide optimal performances of handling and quick traction response.

For that reason, as shown in FIGS. 1-3, preferably the central portion L1 has a relatively high density di sipes.

Preferably, the central portion L1 has a density of sipes 20 comprised in the range between 0.160 and 0.180.

Preferably, the density of the sipes 20, 22, 23 progressively decreases moving away from equatorial plane X-X.

Further in detail, referring to the embodiment shown in FIGS. 1-3, the density of the first sipes 20 of the central portion L1 is greater than the density of the sipes 22, 23 of each lateral portion L2, L3 and the density of the sipes 22, 23 of each lateral portion L2, L3 decreases, preferably progressively, moving away from equatorial plane X-X.

Yet more in detail, always referring to embodiment shown in FIGS. 1-3, the density of the first sipes 20 of the central portion L1 is greater than the density of the sipes 22 of the first lateral sub-portion 18 and the density of the sipes 22 of the first lateral sub-portion 18 is greater than the density of the sipes 23 of the second lateral sub-portion 19.

Preferably, the first lateral sub-portion 18 has a density of the sipes 22 comprised in the range between 0.140 and 0.160.

Preferably the second lateral sub-portion 19 has a density of the sipes comprised in the range between 0.080 and 0.110.

Preferably the extension direction of the second sipes 22 is substantially counter inclined with respect to the one of the first inclined length 12a, 12b of the transversal grooves 12, 13, so as to constantly balance the performances and the behavior of the tyre while running in corners.

Preferably, the second sipes 22 have an inclination $\gamma \leq 80°$ with respect to equatorial plane X-X.

In the second lateral sub-portion 19 the inclination of the third sipes 23 is in contrast such that to increase the features of traction and braking during the running in straight line. For this reason, the inclination of the third sipes 23 substantially follows the inclination of the second inclined length 12b, 13b of the transversal grooves 12, 13.

In detail, in the second lateral sub-portion 19 the third sipes 23 extend parallel each other and in a direction substantially parallel to the one of the second inclined length 12b; 13b of the transversal grooves 12, 13. The third sipes 23 preferably axially extend for at least the 70% of the second lateral sub-portion 19.

Referring to embodiment shown in FIGS. 1-3, the third sipes 23 have an inclination $\beta$ with respect to equatorial plane X-X comprised in the range between 60° and 85°.

Conveniently, as in the embodiment shown in FIGS. 1-3, at least a part of the third sipes 23, preferably all, can extend on the second lateral sub-portion 19 on the prolongation of the second sipes 22, so as to form substantially continuous sipes on the lateral portions L2, L3.

In the embodiment shown in figures the second sipes 22 do not have a constant depth along their extension but, as better shown in FIG. 2, have a maximum depth in correspondence of their central portion and at least two respective section reductions in correspondence of the ends.

Alternatively, the second sipes 22 can have a constant depth all along their extension, without departing from the scope of protection of the present invention.

Preferably the second and third sipes 23 have a maximum depth greater than about 3 mm, more preferably greater about di 5 mm. The second sipes 22 have a maximum depth smaller than about 10 mm.

Each third sipe 23 has not a constant depth along its extension, but a depth characterized by a stepped profile provided with a central portion of a limited extension with reduced depth.

Alternatively, the third sipes 23 could have constant depth along the entire extension.

In the embodiment shown in FIGS. 1-3 the second and the third sipes 22, 23 have a maximum width smaller than about 2 mm, preferably smaller than about 1.5 mm.

Always referring to embodiment shown in FIGS. 1-3, the first lateral sub-portion comprises of the fourth sipes 24 between a second sipe 22 and the adjacent one in circumferential direction. Preferably the fourth sipes 24 extend in a direction substantially orthogonal to the second sipes 22.

Always referring to embodiment shown in FIGS. 1-3, the second lateral sub-portion 19 comprises furthermore of the fifth sipes 25 between a third sipe 23 and the adjacent one in the circumferential direction or between a third sipe 23 and the transversal groove 12, 13 adjacent in the circumferential direction. Preferably the fifth sipes 25 extends in a direction substantially orthogonal to said third sipes 23.

The fourth and fifth sipes 24, 25 have a limited extension and depth.

EXAMPLES

Different samples of the tyre according to different embodiments of the invention have been made, in particular, having the tread of FIGS. 1-3, but with two different types of compound, respectively a softer compound specialized towards the use on snow (Inv. 1) and a more rigid compound principally devoted to a use on wet and dry, with a still appropriate performance on the snow (Inv. 2).

The tyres according to the invention, respectively Inv. 1 and Inv. 2, have been subject to comparison tests with a reference tyre P available on the market and that has an "all season" tread of a directional type being characterized by a central portion and by two lateral portions having a plurality of transversal grooves that extend moving away from equatorial plane up to the edges tread band.

All the tyres have a size 185/65 R15, with a rim 6.0J and inflation pressure 2.2 bar.

The tests have been performed by providing a car (Volkswagen Golf for the tests on the snow and Fiat Punto for the resting tests) with the comparison tyres.

Straight stretch and cornering aquaplane tests, braking tests on dry and wet road surfaces, drive behavior tests on dry and wet road surfaces, noise tests inside the car and traction and braking tests on snow-covered road surfaces have been carried out.

The straight stretch aquaplane test has been carried out on a straight portion of smooth asphalt with a predetermined length (100 m) with a water layer having a predetermined constant height (7 mm) automatically restored any time the tested car went past. During the test, the vehicle goes into the water layer at a predetermined speed (circa 70 Km/h) in total grip conditions, and accelerates until it completely loses grip.

The cornering aquaplane test has been carried out on a track stretch of smooth and dry asphalt at a bend of constant radius (100 m) having a predetermined length and comprising, in a final stretch, an area of predetermined length (20 m) flooded with a water layer having a predetermined thickness (6 mm). The test has been carried out at constant speed, with different speeds.

During the test, the maximum centrifugal acceleration and the maximum speed of the car when the total aquaplane occurs, are detected.

The braking test, is performed both under wet and dry road conditions with tyres equipping a vehicle provided with an antilock braking system (ABS) of the wheels.

This braking test was carried out on a straights stretch of asphalt, both under dry and wet conditions, and the stopping distance at a predetermined starting speed, typically 100 km/h under dry conditions and 80 km/h under wet conditions, are detected.

The travelling behavior test, under dry and wet surface conditions, is carried out on predetermined tracks, typically tracks closed to traffic. By simulating some characteristic maneuvers (such as lane changing, overtaking, slalom between cones, entering and exiting a corner) at a constant speed, as well as while accelerating and decelerating, the test diver evaluates the performances of the tyre by giving the latter a numerical appraisal during the above mentioned manoeuvres.

The braking test on a snow-covered road has been carried out by making the vehicle decelerate from 50 to 5 km/h using both the antilock brake system (ABS) of the wheels, and the travelling with blocked wheels.

The traction test on a snow-covered road has been carried out by making the vehicle accelerate from 0 to 35/40 km/h, wherein through accelerometer the traction force exerted by the tyre on the road surface covered by snow is detected.

The subjective noise test has been carried out a decreasing speeds from 120 Km/h (or a speed compatible with the power and streamlined noise the car emits, anyway, not less than 100 Km/h) to 0 km/h with the gearshift in neutral, the engine and air-conditioning unit off and windows closed.

The loudness (sound level and frequency as a speed function) of the tread blocks has been evaluated. The best tyre minimizes all the described sound components when the speed changes.

The results of the tests are reported in Table I, wherein the values of ratings are expressed in percentage and values referring to the comparison tyre are set to 100.

TABLE I

|  | Comparison | Inv. 1 | Inv. 2 |
| --- | --- | --- | --- |
| Aquaplane during cornering | 100 | 97 | 100 |
| Aquaplane in straight stretch | 100 | 100 | 100 |
| Subjective noise | 100 | 111 | 111 |
| Braking on dry surface | 100 | 97 | 100 |
| Braking on wet surface | 100 | 98 | 100 |
| Behavior on dry surface | 100 | 98 | 101 |
| Behavior on wet surface | 100 | 103 | 107 |
| Braking on snow | 100 | 101 | 97 |
| Traction on snow | 100 | 104 | 97 |
| Rolling resistance | 100 | 103 | 100 |

In Table I, values exceeding 100 indicate an improvement with respect to the reference tyre.

The results of the test show, that the tyre of the invention has values comparable with the reference tyre P for different values excepting some voices wherein, independently of the type of compound used, have greater values.

In particular, the tyre of the invention has noise features and behavior in wet conditions decisively greater.

In the complex, the evaluation of the tyre of the invention results on average greater with respect to the reference tyre.

The present invention has been described with reference to some embodiments.

Different adaptations can be carried to the embodiments described in detail, still resting anyway within the scope of protection of the invention, defined by the following claims.

The invention claimed is:

1. A car tyre having a tread that extends in axial direction for a width L; said tread comprising a central portion arranged across an equatorial plane, and two lateral portions opposed with respect to the central portion,
   the central portion being separated from the lateral portions of the tread by two circumferential grooves, said circumferential grooves having a width greater than about 6 mm;
   the central portion extending in axial direction for a width less than 20% of the width of said tread; and
   the central portion comprising a plurality of first sipes;
   each lateral portion having a width greater than 30% of the width L of said tread;
   each lateral portion comprising a plurality of transversal grooves, the transversal grooves of a lateral portion comprising at least a first inclined length that extends from a zone proximal to respective circumferential grooves, moving away from equatorial plane, said first inclined length having an inclination $\alpha \leq 60°$ with respect to the equatorial plane; and
   each lateral portion comprising a plurality of sipes, the density of the sipes decreasing moving away from the equatorial plane.

2. The tyre according to claim 1, wherein each lateral portion comprises a first axially inner lateral sub-portion and a second axially outer lateral sub-portion;
   the first lateral sub-portion and the second lateral sub-portion comprise respectively a plurality of second and third sipes;
   the density of the first sipes is greater than the density of the second sipes; and
   the density of the second sipes is greater than the density of the third sipes,
   wherein each transversal groove further comprises at least a second inclined length and at least a linking length interposed between the first inclined length and the second inclined length, said second inclined length being counter inclined with respect to first inclined length, and
   wherein the third sipes axially extend for at least 70% of the second lateral sub-portion.

3. The tyre according to claim 1, wherein said central portion has a density of said first sipes in a range between about 0.16 and about 0.18.

4. The tyre according to claim 2, wherein said first lateral sub-portion has a density of said second sipes in a range between about 0.14 and about 0.16.

5. The tyre according to claim 2, wherein said second lateral subportion has a density of said third sipes in a range between about 0.08 and about 0.11.

6. The tyre according to claim 1, wherein the first sipes extend substantially perpendicularly to the equatorial plane.

7. The tyre according to claim 1, wherein said first sipes are spaced in circumferential direction and substantially without points of reciprocal intersection.

8. The tyre according to claim 2, wherein the second sipes are reciprocally parallel.

9. The tyre according to claim 2, wherein the second sipes are counter inclined with respect to the first inclined length of the transversal grooves.

10. The tyre according to claim 9, wherein the second sipes have an inclination $\gamma \leq 80°$ with respect to the equatorial plane.

11. The tyre according to claim 1, wherein said tread has a void-to-rubber ratio greater than 0.27.

12. The tyre according to claim 1, wherein said central portion has a void-to-rubber ratio greater than 0.35.

13. The tyre according to claim 1, wherein the lateral portions have a void-to-rubber ratio greater than 0.26.

14. The tyre according to claim 2, wherein said at least a linking length is arranged at a distance with respect to the equatorial plane less than 40% of L/2.

15. The tyre according to claim 14, wherein said linking length is arranged at a distance with respect to equatorial plane in a range between 20% of L/2 and 35% of L/2.

16. The tyre according to claim 2, wherein said second inclined length has an inclination $\beta \geq 45°$ with respect to the equatorial plane.

17. The tyre according to claim 16, wherein said second inclined length has an inclination in a range between about 60° and about 85°.

18. The tyre according to claim 2, wherein said second inclined length has an axial extension greater than 50% of a width of a respective lateral portion in which said second inclined length extends.

19. The tyre according to claim 1, wherein said transversal grooves have a width greater than about 3 mm.

20. The tyre according to claim 1, wherein the transversal grooves have a depth greater than about 4 mm.

21. The tyre according to claim 1, wherein said circumferential grooves have a depth greater than about 7 mm.

22. The tyre according to claim 2, wherein the third sipes extend substantially parallel to each other and substantially parallel to said second inclined length.

23. The tyre according to claim 2, wherein at least a part of the third sipes extends, on the second lateral subportion, on a prolongation of the second sipes so as to form substantially continuous sipes on the lateral portions.

24. The tyre according to claim 2, wherein said first lateral sub-portion comprises fourth sipes between couples of second sipes adjacent in circumferential direction, said fourth sipes extending in direction substantially orthogonal to said second sipes.

25. The tyre according to claim 2, wherein the second lateral sub-portion comprises fifth sipes between a third sipe and an adjacent sipe in circumferential direction or between a third sipe and the transversal groove adjacent in circumferential direction, said fifth sipes extending in a direction substantially orthogonal to said third sipes.

26. The tyre according to claim 2, wherein said first lateral sub-portion and said second lateral sub-portion are separed in axial direction by a first circumferential notch.

27. The tyre according to claim 25, wherein said first circumferential notch is arranged at a distance with respect to the equatorial plane less than 50% of the width of a respective lateral portion.

28. The tyre according to claim 26, wherein said first circumferential notch intercepts the transversal grooves moving away from equatorial plane, in a point downstream said first inclined length.

29. The tyre according to claim 26, wherein said central portion comprises a second circumferential notch arranged across the equatorial plane.

30. The tyre according to claim 29, wherein said first circumferential notch and second circumferential notch have a width less than a width of the circumferential grooves.

31. A car tyre having a tread that extends in axial direction for a width L; said tread comprising a central portion arranged across an equatorial plane, and two lateral portions opposed with respect to the central portion, the central portion being separated from the lateral portions of the tread by two circumferential grooves, said circumferential grooves having a width greater than about 6 mm;

the central portion extending in axial direction for a width less than 20% of the width of said tread; and the central portion comprising a plurality of first sipes;

each lateral portion having a width greater than 30% of the width L of said tread;

each lateral portion comprising a plurality of transversal grooves, the transversal grooves of a lateral portion comprising at least a first inclined length that extends from a zone proximal to respective circumferential grooves, moving away from equatorial plane, said first inclined length having an inclination $\alpha \leq 60°$ with respect to the equatorial plane, wherein each transversal groove further comprises at least a second inclined length and at least a linking length interposed between the first inclined length and the second inclined length, said second inclined length being counter inclined with respect to first inclined length.

* * * * *